April 14, 1953  R. G. RUSSELL  2,634,553
APPARATUS FOR FORMING GLASS FIBERS
Filed Dec. 14, 1948  2 SHEETS—SHEET 1
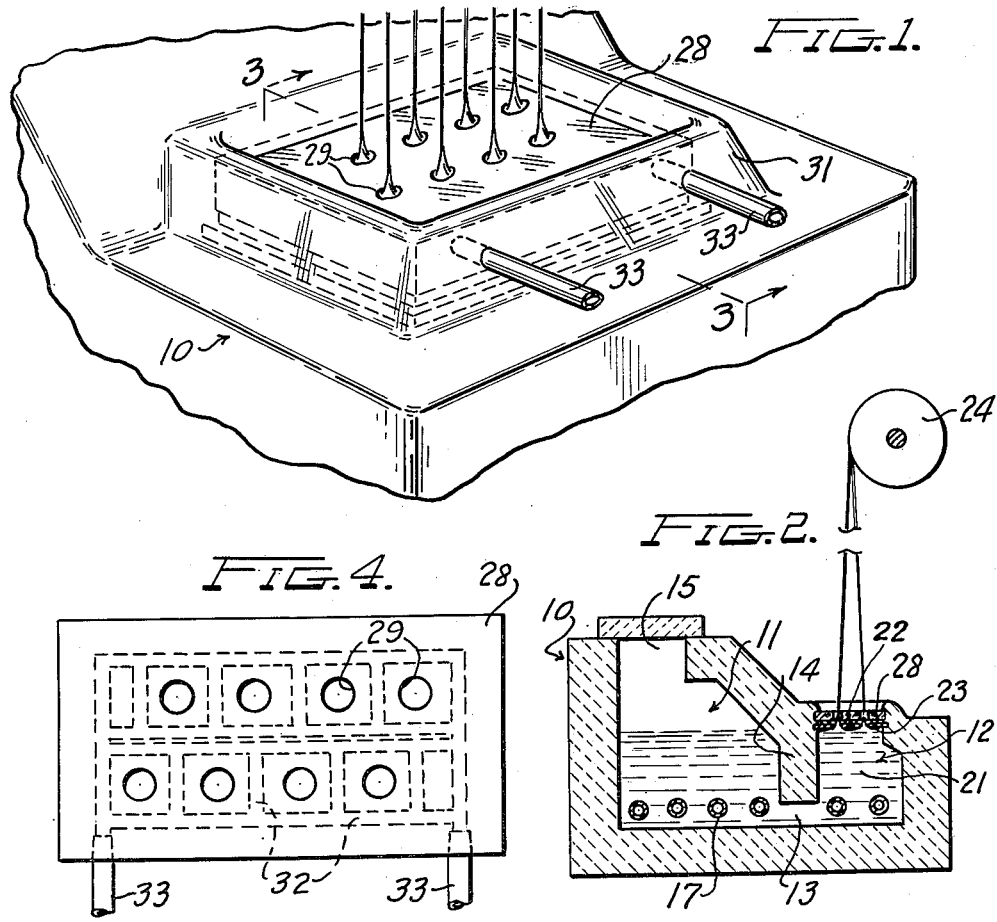
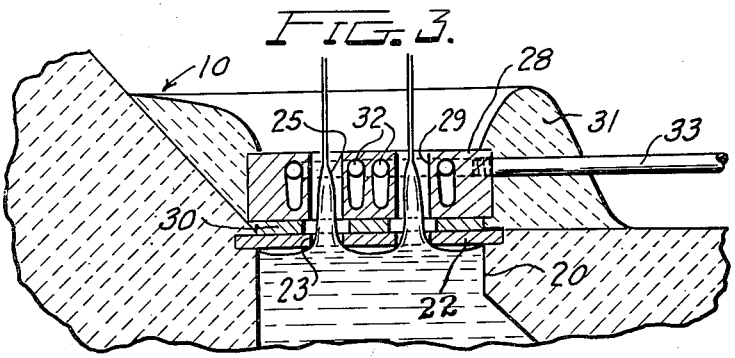
INVENTOR.
Robert G. Russell
BY
Staelin & Overman
ATTORNEYS April 14, 1953  R. G. RUSSELL  2,634,553
APPARATUS FOR FORMING GLASS FIBERS
Filed Dec. 14, 1948  2 SHEETS—SHEET 2
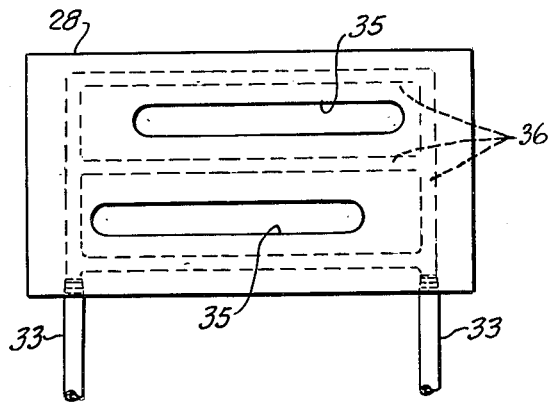
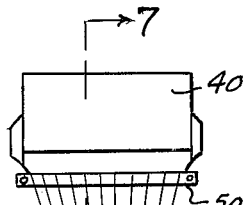
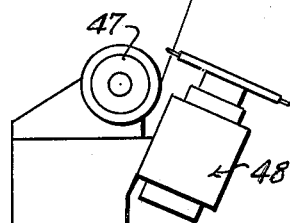
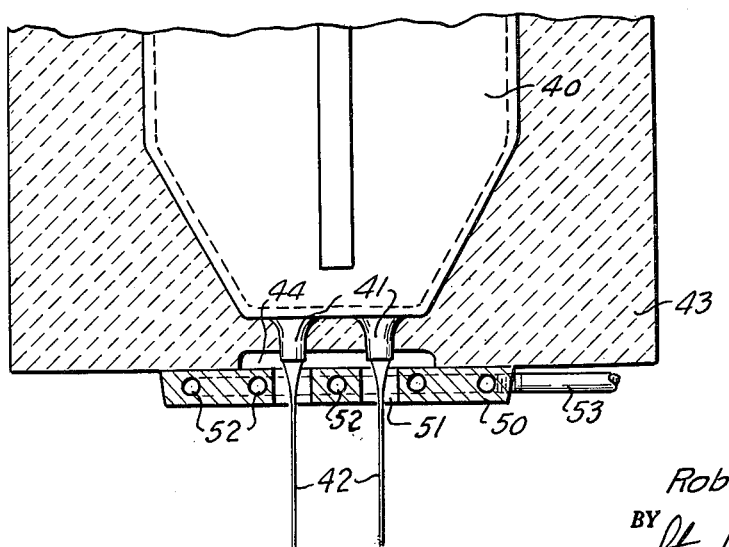
INVENTOR.
Robert G. Russell
BY Staelin & Overman
ATTORNEYS Patented Apr. 14, 1953

2,634,553

UNITED STATES PATENT OFFICE 2,634,553

APPARATUS FOR FORMING GLASS FIBERS

Robert G. Russell, Granville, Ohio, assignor to Owens-Corning Fiberglas Corporation, a corporation of Delaware Application December 14, 1948, Serial No. 65,139

9 Claims. (Cl. 49—17)

1

The present invention relates to improvements in the production of fibers from heat softenable materials and particularly from siliceous materials such as glass or the like.

The present invention relates to the production of glass fibers and is described in connection with the process in which a plurality of streams of molten glass are attenuated mechanically to fine fibers of unlimited length and wound on a drum. Fibers formed in this manner may then be processed on conventional textile machinery for subsequent processing into mats or woven or knitted fabrics.

It is generally customary to form continuous type fibers by flowing streams of molten glass or other materials by gravity from the discharge orifices of a container in which the material is reduced to a molten state. In this form of apparatus the discharge orifices are preferably formed in projecting tips or nipples having a relatively thin wall to provide for the rapid loss of heat from the streams as the glass flows from the tips. The streams cool upon contact with the atmosphere and surface tension causes the stream to "neck in" and form a cone from the apex of which the filament is attenuated. Maintaining uniformity of diameter of filaments produced in this manner presents a major problem in which such factors as glass level in the containers or bushing, glass temperature, rate of attenuation, and atmospheric conditions must be considered.

Drafts of cold air created by the downward movement of the filaments as the streams are attenuated at high speed tend at times to chill the hot streams unequally in the region of the tips. Under these conditions some of the streams become chilled and break or become excessively heated and burn off while still others tend to increase in size. In order to overcome this and other difficulties it has been proposed to draw the fibers upwardly from a pool of glass. This manner of forming fibers or filaments comprises immersing a pick or other pointed metallic instrument to which glass will adhere into a pool of molten glass and drawing it upward. The glass adheres to the point and the resulting filament may be attenuated by any suitable means, such as by winding on a drum or spool. When a plurality of filaments are drawn simultaneously in closely spaced relation it is advantageous to provide an orifice plate or grid adjacent the glass surface to prevent surface tension on the glass surface from drawing the filaments together and thereby keep them separated.

2

This method of forming fibers overcomes to some extent the difficulties encountered in the downward drawing of fibers but it has been found that when a fiber being drawn upwardly breaks during attenuation the portion still joined to the molten material falls against the adjacent cones thus becoming entangled and stopping the operation.

It is a primary object of the invention to overcome these difficulties by providing a simple and efficient means for creating a suitable environment in the attenuating region of a stream of molten glass.

Another object of the invention is the provision of means for controlling the diameter of filaments of glass attenuated from molten streams thereof.

Another object of the invention is the provision of a shield associated with the flow orifices of a glass melter to protect the streams flowing therefrom from sudden changes in temperature and for excluding foreign matter from the vicinity of the source of said streams.

Other objects of the invention and features of novelty will become apparent during the course of the following description when considered in the light of the accompanying drawings, in which:

Figure 1 is a perspective view of a glass filament forming apparatus embodying the present invention;

Figure 2 is a vertical sectional view through one form of fiber forming apparatus with which the present invention may be associated;

Figure 3 is a vertical sectional view taken substantially along the line 3—3 of Figure 1 and illustrating elements of the present invention;

Figure 4 is a plan view of an orifice plate forming the present invention;

Figure 5 is a plan view of a modified form of the invention shown in Figure 4;

Figure 6 is a diagrammatic elevational view of a modified form of apparatus embodying the present invention; and Figure 7 is a vertical sectional view through the apparatus shown in Figure 6 as indicated by the line 7—7.

Referring now to Figures 1 and 2 of the drawings, the preferred embodiment of the present invention comprises generally a glass melting tank 10 formed preferably of refractory material and comprising a melting chamber 11 and a refining and delivery chamber 12 connected at the bottom by a channel 13 formed in a bridge wall 14. This construction provides a container having a substantially U-shaped passage therein.

Material to be melted such as glass forming batch is supplied to the melting chamber 11 through a charging opening 15 at the top of the melting chamber. The opening 15 also serves as an exhaust port for gases evolved during melting of the batch.

Heat may be supplied to the chambers 11 and 12 by means of electrically heated coils 17 of tungsten, molybdenum, platinum, or other suitable materials arranged along the bottom wall of the chambers, or by other suitable means whereby the batch materials are melted and held at the proper delivery temperature. Ordinarily, a higher degree of heat is required in the melting chamber than is desirable in the fined glass in the delivery chamber so that provision is usually made for individual control of temperatures in the chambers. It will be understood, of course, that other sources of heat may be employed such as gas or other fuel.

An opening 20 in the top wall of the delivery chamber 12 provides access to the supply body of glass 21 from which the fibers are drawn. The supply body is maintained at a substantially constant level by feeding batch material to the melting chamber 11 at a rate preferably equal to the rate at which glass is withdrawn from the delivery chamber as fibers. Variations in the level of glass in such operations as the present tend to produce non-uniformities in the fibers. For instance, a low level of glass may make starting and continuance of the operation highly difficult while too high a level may cause flooding of the molten glass into the draw opening, thus stopping the operation entirely.

When a large number of closely spaced filaments are drawn at the same time from the same surface it is essential that the conoidal formations be prevented from coming in contact with one another and sticking together. For this reason it is preferable to separate them and to this end an orifice plate such as a draw plate 22 or grid having orifices 23 is mounted in the opening 20 and at substantially the level of the glass. The openings 23 in the plate uniformly space the filaments to facilitate starting and subsequent handling. The filaments may be started by inserting a pick or starting wire in the openings 23 and drawing the glass upwardly. The fibers may then be wound as a strand on a spool 24.

As previously mentioned, the drawing of filaments upwardly produces a cone-like formation 25 of molten glass with the filament extending from the apex thereof. This cone is the result of several factors which include temperature and viscosity of the glass and the effect of surface tension on the glass. In the highly molten state the cone 25 is readily affected by sudden atmospheric changes which alter the size of the filament and is exposed to contact with dirt or broken fibers which cause stoppage of the operation.

It has long been a problem in the production of fibers or filaments to maintain a suitable environment in the attenuating zone. This has been accomplished in the present invention by providing a plate 28 (Figures 3 and 4) having holes 29 corresponding in number and also substantially in size to the orifices 23 in the grid and disposed in proximity thereto. The plate 28 may have a thickness of one-quarter inch to one inch depending on the type of operation or other operating conditions. However, it has been determined that a depth sufficient to substantially enclose the cone is most suitable. The plate 28 is preferably supported in spaced relation to the grid 22 and there is provided between them either a dead air space or a thin layer of suitable insulating material, such as a glass fiber fabric, as indicated at 30 in Figure 3. This spacing prevents direct contact of the plate with the grid and thus avoids a too rapid extraction of heat from the surface of the glass. The plate may be embedded in cement as at 31 or otherwise secured in place.

The plate 28 is provided with a series of interconnected passages 32 for the transmission of a cooling fluid. The coolant, which may be water, is circulated through the plate from piping 33 connecting with a suitable source of supply. The water for cooling the plate is supplied at a substantially constant temperature in order to maintain as nearly as possible a uniform temperature throughout the plate. The cooling effect of the fluid passing through the plate provides a substantially uniform temperature within the holes 29 so that the cones 25 of hot glass are cooled uniformly. Thus a constant filament diameter is assured. The depth of the plate tends to prevent sudden atmospheric changes or drafts from coming in contact with the hot cones and also protects the cones against dust, falling fibers, etc. The plate is so spaced with relation to the source of the glass streams that it substantially encloses the tip or attenuating zone of the cones and in this way provides a uniform environment in which the filament is formed.

Figure 5 illustrates a modified form of plate 28 in which continuous slots 35 are provided in place of the holes 29. Passages 36 for a coolant extend parallel to the slots and serve to cool the plate. The slots simplify starting the filaments without materially affecting the operation of the device.

Referring now to Figures 6 and 7 of the drawings, the invention is shown in connection with an apparatus for forming glass filaments in which the filaments are drawn downwardly. In this form the apparatus comprises a glass melting container 40 or bushing in which glass batch materials are melted. The container is usually rectangular in shape and formed of platinum or other heat resistant metal for connection in an electrical heating circuit. The bushing 40 is usually provided in its bottom wall with a plurality of rows of orifices in the form of tips 41 or nipples through which the glass flows in the form of fine streams 42. The metallic bushing is enclosed in insulating material 43 which also covers the tips for a major part of their length. The insulating material in the region of the ends of the tips 41 is molded to provide a recess 44 surrounding the tips to reduce the tendency of the molten glass to flood the bottom of the bushing.

The streams 42 are attenuated to fine fibers by gathering the streams together at a guide 45 to form a strand 46 which is wound on a spool 47 at high speed by winding mechanism 48 of any suitable design.

A temperature control plate 50 is disposed beneath the tips 41 of the insulated bushing enclosing the recess 44 and in sealing contact with the insulating material. The plate is provided with a series of holes 51 corresponding in number to the number of tips 41. The plate 50 is also provided with passageways 52 through which a constant temperature cooling fluid supplied through pipes 53 is circulated. The cooled plate absorbs heat radiated from the bushing tips and from the glass flowing therefrom so that a substantially constant temperature is maintained in the attenuating region.

It will be noted in Figure 7 that the plate 50 does not come in contact with the heated metal bushing but is held in spaced relation by the insulation 43. The separation of the plate and bushing prevents the cold surface of the plate from unduly chilling the bottom wall of the bushing and thus affecting the flow characteristics of the glass. The plate serves also as a shield for the bottom of the bushing and as a protection for the exposed tips 41. Thus air induced by the downward movement of the streams does not strike the very sensitive region of the molten glass adjacent the tips.

Modifications may be resorted to within the spirit of the invention and the scope of the appended claims.

I claim:

1. Apparatus for producing glass filaments comprising a container for the molten glass, means for heating the glass in said container, said container having orfices in one wall from which streams of glass are attenuated to fine filaments, a fluid cooled plate having orifices corresponding in number and arrangement to the orifices in said container disposed in spaced relation to said container wall, sealing means between the periphery of said plate and said wall, and means for circulating a cooling fluid through said plate.

2. Apparatus for producing glass filaments comprising a container for the molten glass, means for heating the glass in said container, said container having orifices in one wall from which streams of glass in the form of cones are attenuated to fine filaments, means for rapidly and uniformly reducing the temperature of said streams of glass in the region of the cones including a plate spaced from the orifice containing wall and having openings through which the streams are drawn, and means for circulating a cooling fluid through the plate.

3. Apparatus for producing glass filaments comprising a container for the molten glass, means for heating the glass in said container, said container having orifices in one wall from which streams of glass are attenuated to fine filaments, means for rapidly and uniformly reducing the temperature of said streams of glass in the region of their source including a plate mounted adjacent the orifice containing wall but out of contact therewith, said plate having openings of substantially the size of said orifices and in alignment therewith, and means for circulating a cooling fluid within the plate and between said openings.

4. Apparatus for producing glass filaments comprising a container for molten glass including melting and refining chambers, an orifice plate covering said refining chamber and substantially in contact with the surface of the glass therein, means for drawing streams of glass from said orifices and attenuating them to fine filaments, means for rapidly and uniformly reducing the temperature of the streams adjacent their soure including a second orifice plate out of contact with said first named plate and in alignment therewith, and nonmetallic means disposed between the peripheries of said first and second mentioned plates forming a seal, and means for cooling said second named plate.

5. Apparatus for producing glass filaments comprising a container for molten glass including melting and refining chambers, an orifice plate covering said refining chamber and substantially in contact with the surface of the glass therein, means for drawing streams of glass from said orifices and attenuating them to fine filaments, means for rapidly and uniformly reducing the temperature of the streams adjacent their source including a water cooled orifice plate out of contact with said first named plate and in alignment therewith, and a member disposed between said plates for preventing the inspiration of atmospheric air between said plates.

6. Apparatus for producing glass filaments comprising a container for molten glass including melting and refining chambers, an orifice plate covering said refining chamber and substantially in contact with the surface of the glass therein, means for drawing substantially cone-shaped streams of glass from said orifices and attenuating them to fine filaments, means for rapidly and uniformly reducing the temperature of the streams adjacent their source including a plate having orifices therein corresponding in number and substantially in size to the orifices in said first-named plate, said second plate out of contact with said first plate and arranged with the orifices substantially enclosing the cone-shaped attenuating region of said streams, a member of nonmetallic material disposed between said plates for preventing the inspiration of atmospheric air around the cone-shaped portions of said streams, and means for cooling said plate to substantially reduce the temperature thereof.

7. Apparatus for producing glass filaments comprising a container for molten glass, a row of projecting nipples on one wall of the container having orifices therein through which the glass flows in the form of streams, insulation covering said container and extending around said nipples, a plate disposed adjacent the ends of said nipples and in sealing contact with said insulation, said plate having orifices in alignment wth said nipples through which the streams flow and are attenuated, means for circulating a cooling fluid through said plate and between said orifices to rapidly and uniformly cool the streams, and means for attenuating the streams to filaments.

8. Apparatus for producing glass filaments comprising a container for molten glass, a row of projecting nipples on one wall of the container having orifices therein through which the glass flows in the form of streams, insulation covering said container and forming a recess around said nipples, a plate disposed adjacent the ends of said nipples and covering said recess, said plate having orifices in alignment with said nipples through which the streams flow and are attenuated, means for circulating a cooling fluid through said plate and between said orifices to rapidly and uniformly cool the streams, and means for attenuating the streams to filaments.

9. In an apparatus for producing glass filaments comprising a container for molten glass and having orifices in one wall from which streams of glass are drawn thereby forming an attenuating zone outwardly of the container, means for continuously attenuating the streams to fine filaments and winding the filaments on a spool, a plate mounted adjacent the orifice containing wall but out of contact therewith, said plate provided with orifices in alignment with the orifices forming the sources of said streams and disposed substantially in the attenuating zone, heat insulating means disposed between the plate and said container, and means for cooling the plate to rapidly and uniformly reduce the temperature of the streams in the attenuating zone by proximity of the streams to said plate.

ROBERT G. RUSSELL.

References Cited in the file of this patent

UNITED STATES PATENTS

| Number | Name | Date |
|---|---|---|
| 1,796,571 | Mathieu | Mar. 17, 1931 |
| 2,194,814 | Stewart | Mar. 26, 1940 |
| 2,225,667 | Staelin | Dec. 24, 1940 |
| 2,229,489 | Barnard | Jan. 21, 1941 |
| 2,335,135 | Staelin | Nov. 23, 1943 |